United States Patent [19]
Juday

[11] Patent Number: 5,416,618
[45] Date of Patent: May 16, 1995

[54] FULL COMPLEX MODULATION USING TWO ONE-PARAMETER SPATIAL LIGHT MODULATORS

[75] Inventor: Richard D. Juday, Houston, Tex.

[73] Assignee: The United States of America as represented by the Administrator of the National Aeronautics & Space Administration, Washington, D.C.

[21] Appl. No.: 977,302

[22] Filed: Nov. 10, 1992

[51] Int. Cl.$^6$ .............................................. G02F 1/01
[52] U.S. Cl. .................................... 359/53; 359/247; 359/250; 359/259; 359/279
[58] Field of Search ............... 359/247, 248, 250, 259, 359/279, 63, 64, 65, 10, 11, 21, 559, 560, 561, 53

[56] References Cited

U.S. PATENT DOCUMENTS

| | | | |
|---|---|---|---|
| 3,558,214 | 1/1971 | De Lang et al. ..................... | 359/259 |
| 3,753,608 | 8/1973 | Bernal ................. | 359/259 |
| 4,127,322 | 11/1978 | Jacobson et al. . | |
| 4,235,516 | 11/1980 | Shreve ................. | 359/259 |
| 4,425,028 | 1/1984 | Gagnon et al. . | |
| 4,500,172 | 2/1985 | Gagnon et al. . | |
| 4,584,541 | 4/1986 | Nossen ................. | 332/16 |
| 4,862,116 | 8/1989 | Olver ................. | 332/23 |
| 4,867,543 | 9/1989 | Bennion et al. ................. | 350/384 |
| 4,909,601 | 3/1990 | Yajima et al. . | |
| 4,943,154 | 7/1990 | Miyatake et al. . | |
| 4,989,259 | 1/1991 | Pedotti et al. ......................... | 382/42 |
| 4,995,702 | 2/1991 | Aruga . | |
| 5,056,039 | 10/1991 | Caulfield ............................. | 364/513 |
| 5,056,897 | 10/1991 | Akiyama et al. ..................... | 359/72 |
| 5,083,857 | 1/1992 | Hornbeck ............................ | 359/291 |
| 5,119,214 | 6/1992 | Nishii et al. ............................ | 359/21 |
| 5,121,228 | 6/1992 | Paek ......................................... | 359/7 |
| 5,148,157 | 9/1992 | Florence ............................ | 340/783 |
| 5,235,461 | 8/1993 | Kirsch et al. ........................ | 359/561 |

OTHER PUBLICATIONS

R. D. Juday and J. Florence; "Full Complex Modulation with Two One-Parameter SLMs;" SPIE Proceedings 1558; pp. 499–504; San Diego, Jul. 1991.
R. D. Juday and J. M. Florence; "Full Complex Spatial Filtering with a Phase Mostly DMD;" SPIE Proceedings 1558; San Diego; Jul. 1991.
D. A. Gregory et al.; "Full Complex Modulation using Liquid-crystal Televisions;" Applied Optics, vol. 31, No. 2; Jan. 10, 1992.

Primary Examiner—Martin Lerner
Attorney, Agent, or Firm—James M. Cate; Edward K. Fein; Guy M. Miller

[57] ABSTRACT

Full complex spatial light modulation is enabled by an optically additive combination of the actions of separate and independent spatial light modulators, even though the independent modulators can each express only a one-parameter subset of complex values called its operating curve. Similarly the operating curve of a single modulator can be shifted (biased) by optically adding a constant complex value.

24 Claims, 13 Drawing Sheets

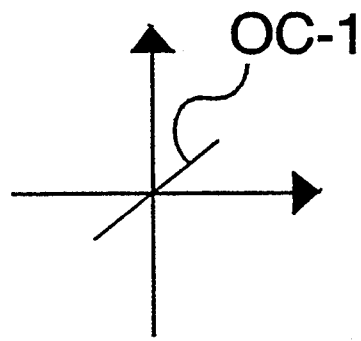
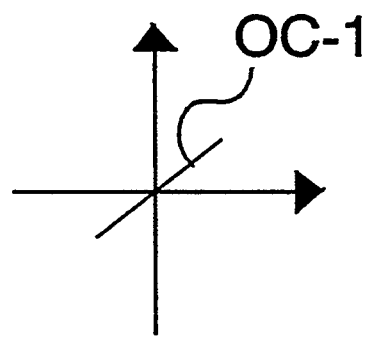
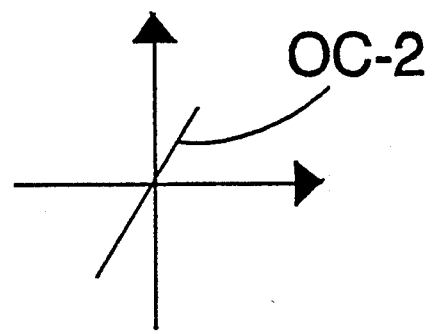
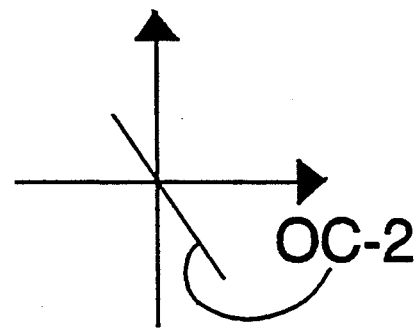
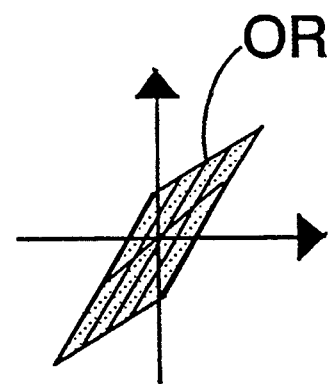
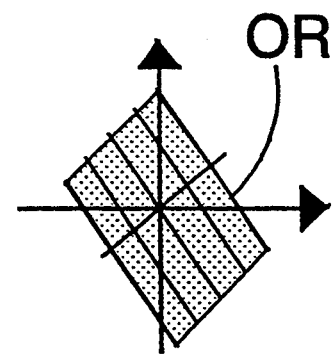
FIG. 5A      FIG. 5B Multiply            Add

FULL COMPLEX MODULATION USING TWO ONE-PARAMETER SPATIAL LIGHT MODULATORS

ORIGIN OF THE INVENTION

The invention described herein was made by an employee of the United States Government and may be manufactured and used by or for the Government of the United States without the payment of any royalties thereon or therefor.

BACKGROUND OF THE INVENTION

1. Field of the Invention

The invention relates to spatial light modulators, and more specifically to spatial light modulators wherein full complex modulation is achieved by superimposing the output of more than one modulator.

2. Description of the Related Art

Spatial light modulators (SLMs) are devices used to control the distribution of light in an optical system. Such devices have many uses including signal processing and pattern recognition.

Generally, the light modulation characteristics of most SLMs are coupled combinations of amplitude and phase changes. The modulation characteristic of a picture element (pixel) is controlled by a single applied signal, (electrical voltage, current, or incident optical intensity level, for example) and, because they are coupled, phase change and amplitude cannot be independently controlled.

U.S. Pat. No. 5,148,157 to Florence, incorporated herein and made a part hereof, teaches a method of controlling the amplitude and phase modulation of light independently and simultaneously by dividing the pixels into more than one modulating element per pixel, independently controlling the sub-elements, and subsequently combining the partial modulation results by optically under-resolving them into pixels.

Optimizing of the signal to noise ratio, as well as other operations using lightwaves, is enhanced by using spatial light modulators (SLMs) that can express full complex behavior. Typically, the action of an SLM is restricted to certain locations in the complex plane characteristic of the particular SLM, called its operating curve.

As noted above, in the art of optical information processing it is frequently desirable to have light modulation that can take an arbitrary complex value. Consideration must be given to physical limitations; for example, a purely passive light modulator might have any phase between 0 and $2\pi$ radians, but its amplitude is necessarily less than unity. The values of the modulator's action might be specified in terms of their real and imaginary parts, or equivalently, in terms of their amplitude and phase. As is often customary in optical information processing, the action herein is described in terms of amplitude and phase. In order to produce arbitrary values of modulation it is necessary to have independent control of amplitude and phase. To effect fully complex modulation in an optical processing system one might resort to such methods as volume holography. However, the volume holographic method is not optimal for a real-time optical information processing system, since this method is ordinarily based on photographic emulsion that is not rapidly programmable. See for example, virtually any of the articles, and their references, in *Optical Pattern Recognition:* proceedings of a conference held 4 Nov. 1991, San Jose Calif./sponsored by SPIE—the International Society for Optical Engineering; Joseph L. Horner, Bahram Javidi, editors. Methods of optimizing optical information processing under the limitations imposed by existing rapidly programmable spatial light modulators are well known.

Reference herein is routinely made to pixels, or picture elements, since many of the spatial light modulators on which the invention could be implemented are controlled at a discrete set of locations. It will be understood by those familiar with the art that the description applies as well to those spatial light modulators that are controlled from a continuum of locations, as for example in a light-addressed light valve.

Ordinarily the rapidly reconfigurable spatial light modulators one can conveniently install in optical correlators respond to a single drive parameter and so cannot achieve fully independent amplitudes and phases. Illustrative examples are: the optically addressed and continuously variable liquid crystal light valves manufactured by Hughes, the electrically addressed and continuously variable deformable mirror device manufactured by Texas Instruments, and the electrically addressed and binary magneto-optic device manufactured by Litton. The point is that a single modulator, responding to a single drive parameter, cannot produce an arbitrary complex value of modulation. Signal processing theory shows that access to a fully complex set of filter values is better than access to only a limited set. The classical matched filter, for example, produces the highest signal to noise ratio under some standard circumstances. Yet the existing rapidly changeable and continuously variable modulators have access to at best a one-parameter curve in the complex plane. Discretely variable modulators are even further limited. Consequently, a good deal of effort has gone into finding the optimum representation of a desired filter, given that the filter must be expressed on the operating curve of the continuously variable light modulator. The performance of a correlator would be improved were each pixel in the filter modulator to be fully complex. An additional benefit of the invention relates to optically encoding a signal for later processing. The action of a continuously variable modulator generally couples its effect between amplitude and phase. Thus an optically encoded drive signal would have both phase and amplitude in its physical expression, a circumstance that has some deleterious effects. For a specific example, any phase coupling into the encoding process causes a loss of scale invariance and linearity in the encoded signal. If the signal is encoded at constant phase and variable amplitude, the transform of the encoded signal is scale invariant. That is, when the input signal to be encoded (typically a real scalar) undergoes multiplication by a constant factor, the Fourier transform of the encoded signal then undergoes multiplication by the same constant factor. However, if phase varies with the drive applied to the spatial light modulator, the encoded signal (and also its transform) do not have scale invariance. The effect is well known and is analyzed in terms of the spectral content of frequency modulation (FM) signals.

It is, therefore, an object of the invention to allow constant-phase encoding of signals even with modulators that may have phase variation in their action, with the consequent benefits of scale invariance to optical processing of the encoded signal.

Clearly, to reach an arbitrary point within a region of the complex plane, two independent coordinates are to be controlled. In the present invention, the actions of two independent pixels are averaged together placing their virtual locations into optical conjunction.

U.S. Pat. No. 5,148,157 to Florence teaches a different method of achieving fully complex modulation. Dr. Florence's invention relies on direct adjacency of the addressed pixels, with the averaging action occurring by way of optically under-resolving a pair of pixels.

It is a further object of the present invention, therefore, to take full advantage of the space-bandwidth product (here, taken as the pixel count) of each modulator. Thus, the present invention can be implemented at full pixel count using conventional existing modulators, without resorting to special shaping of addressed pixels or changing the geometry of addressing leads.

It is an additional object of the invention to allow the use of multiple adjacent diffraction orders of the composite modulator's far-field pattern, whereas the Florence invention necessitates blocking the high-frequency components by optically under-resolving the single-plane pixels. It is a still further object of the invention to realize a convenience, when mathematically decomposing a desired fully complex action into separate parts which are to be exercised on the two component spatial light modulators, that one need not take into account a spatial translation between the elements that represent the action. This is a simple and direct result of the independence of the participating pixels. They are placed into optical conjunction with each other, so that there is no translation to take into account.

It is a still further additional object of the invention to realize the optical joint transform of two patterns, one written onto each of the two component modulators. In conventional optical joint transform correlation, the patterns are written onto modulators that are placed side-by-side in the input plane of the correlator. This side-by-side positioning results in a spatial shift of the two patterns input to the joint transform correlator, and even when such spatial shift is a minimum, it translates to a minimum spatial frequency in the transform plane. It is occasionally inconvenient to deal with this frequency shift, even when it is a minimum. The present invention is easily seen to permit a smaller between-pattern translation dimension; indeed, zero relative translation (corresponding to direct superposition of the patterns) may be realized.

It is yet another object of the invention to produce an overall shift in the operating curve of a single addressable spatial light modulator by combining its operation with a static offset from a simple unaddressed surface.

SUMMARY OF THE INVENTION

The invention includes method and architecture that allow two continuously variable SLMs to function jointly so as to access the full interior of a closed curve in the complex plane, even though each SLM is individually restricted to values that lie only on curves (probably not closed) within the complex plane. Two fundamental methods of attaining full complex modulation are described together with their mathematics and signal decomposition in their terms.

BRIEF DESCRIPTION OF THE DRAWINGS

FIG. 5A and FIG. 5B show in the complex plane the different operating regions produced by operating curves OC-1 and OC-2 where OC-2 in FIG. 5A differs from OC-2 in FIG. 5B only by phase.

DETAILED DESCRIPTION OF THE PREFERRED EMBODIMENTS

Figure 1:
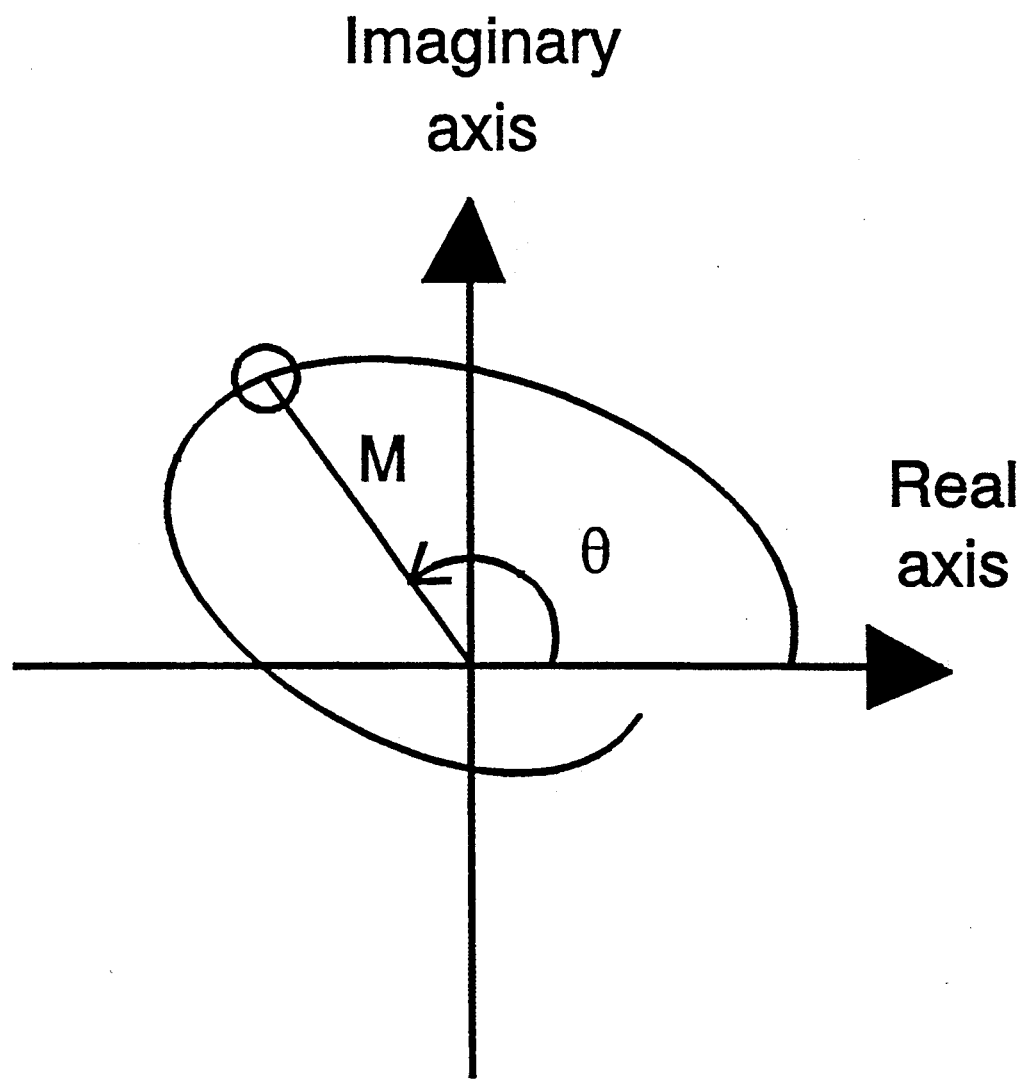
FIG. 1 illustrates in the complex plane the characteristic operating curve of a modulator whose amplitude and phase are coupled.

Most spatial light modulators are passive; that is, they operate on light in any of several ways that do not add energy to the field. Examples are polarization rotation, attenuation, and retardation. In the discipline of Fourier optical signal processing, attenuation is typically called "amplitude modulation"; and retardation, "phase modulation". Examples given herein are discussed principally in terms of amplitude and phase modulation, since the graphics is easier, but it will be appreciated that the polarization modulation is also included and the entirety of a modulator's action may be described by the Jones matrix. See, for example, Chapter 2 in: Grant R. Fowles, *Introduction to Modern Optics;* Holt, Rinehart, and Winston (New York, 1975).

When filters are created on spatial light modulators, it is generally advantageous to have full complex behavior. In optimizing signal to noise ratio, (as well as many other metrics, such as discriminability, peak-to-background ratio, and peak-to-correlation energy ratio) matched filters are known to be ideal. They are generally fully complex.

The inaccessibility to a filter of part of the complex plane generally reduces the competence of the filter. It is desirable, therefore, to use SLMs to make accessible full regions, rather than just a curvilinear portion, of the complex plane.

A SLM is generally understood to have two spatial dimensions, thus allowing us to process (or modulate) an image. Its light modulation action is discussed without explicit reference to its being a two dimensional array. The full complex signal processing discussed herein will be referred to as image correlation by Fourier transform filtering, but in fact any number of other optical signal processing actions requiring full complex modulation may similarly be done. Beam-forming is one such example.

The general sequence of filtering with full complex modulation is as follows. First, choose SLMs with appropriate operating curves; that is, operating curves whose combined output yields coverage of the desired complex area, and mount them as described herein. As will be seen, in creating the fully complex result it is their effect relative to each other that has primary relevance, and there is some freedom in adjusting that relative effect according to how the SLMs are mounted-again, relative to each other. Second, characterize the complex action of the two SLMs as mounted. Next ascertain the accessible portion of the complex plane and conform the filtering problem appropriately. See B. V. K. Vijaya Kumar, Richard D. Juday, and P. Karivaratha Rajan, "Saturated Filters" *JOSA A* 9, 405–412 (1992); Stanley E. Monroe, Jr., Jerome Knopp, and Richard D. Juday, "Adaptive methods of optical correlation with a programmable filter" *Proc Pattern Recognition for Advanced Missile Systems Conference*, U.S. Army Missile Command, Redstone Arsenal, AL, 14–15 Nov. 1988; Michael W. Farn and Joseph W. Goodman, "Optimal maximum correlation filter for arbitrarily constrained devices" *Applied Optics* 28, 3362–3366 (1989); and Richard D. Juday, "Optimal realizable filters and the minimum euclidean distance principle, *Applied Optics* 32, 5100–5111 (1993). Finally, to realize the filter, decompose the desired full complex action into a two-parameter representation based on the relative operating curves.

The interdependence, or coupling, of phase change and amplitude with respect to a single control parameter (such as voltage) may be represented mathematically by complex numbers. Since complex numbers span a two-dimensional plane, representation of an SLM which is controlled by a single operating parameter can not have full complex behavior in the sense of allowing continuously variable access to any point in a region of the plane; i.e., any desired combination of phase change and amplitude. As the controlling parameter changes, the modulator's induced complex action traces out a locus in the complex plane. For a continuous operating parameter (e.g. voltage, in an electrically addressed SLM; or illumination intensity, for a light addressed SLM), it is assumed that a continuous action results. The SLM can be continuously variable but restricted to an origin-centered circle, as in the case of a liquid crystal light valve (LCLV) set up to be a phase-only device. Or, it may be an eccentric circular arc, as in the case of a "piston" deformable mirror device (DMD). Some of the ramifications of the operating curve as it relates to creating arbitrary complex values within a region are discussed below, as well as, how the region is determined. For generality, the modulation of the SLM will be denoted by H; the operating control parameter by V; the magnitude of the SLM response by M; and the phase of the SLM response by $\theta$.

$$H(V) = M(V) \exp[j\theta(V)] \qquad (1)$$

In FIG. 1 is shown an example of an operating curve representing the coupling of the phase and amplitude of a SLM. Neither the phase nor the amplitude changes independently. As the controlling parameter changes, the magnitude M and the phase $\theta$ trace out the indicated curve in the complex plane.

Figure 2:
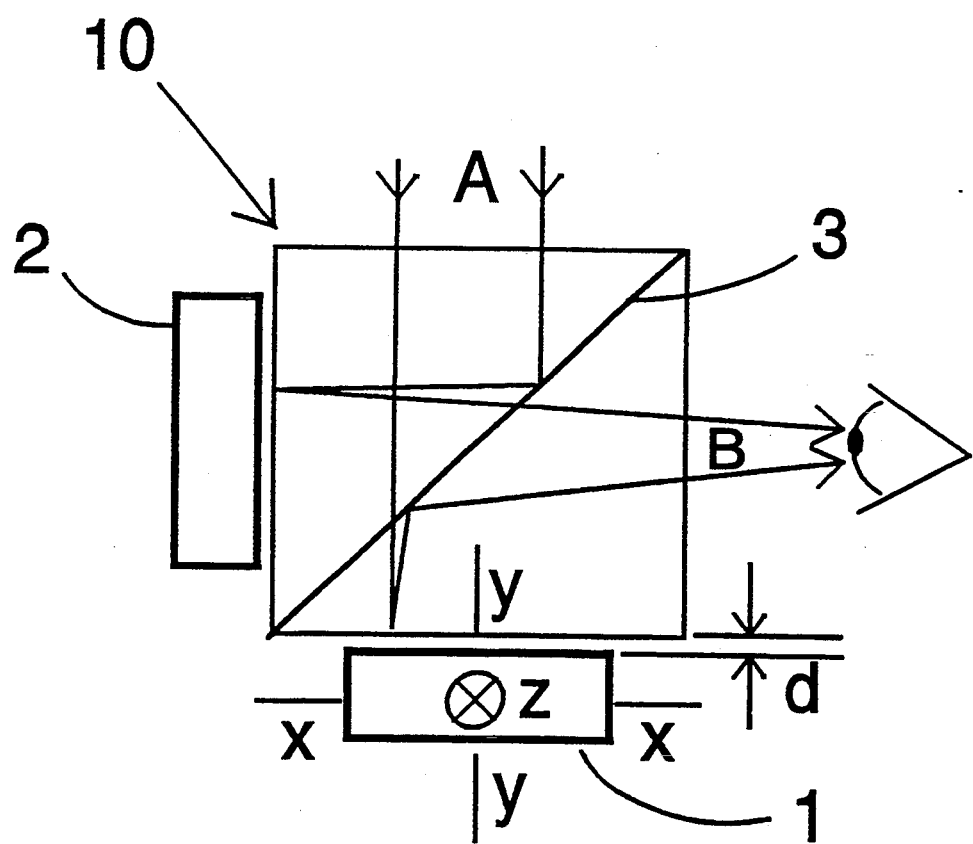
FIG. 2 depicts superposition of virtual image of SLM 2 at the location of SLM 1 so that the actions of two modulators are added at the viewing location.

In FIG. 2 and FIG. 3 are shown two architectures each of which combines the operation (each according to its own operating curve) of two different SLMs. FIG. 2 illustrates a system 10 in accordance with one embodiment of the invention, whereby the path of a lightwave A is split by a beam splitter 3 and modulated by SLMs 1 and 2, so that half of the observed effect originates in each modulator. As seen at B, the actions are averaged (added). This is believed to be a result of the quantum mechanical nature of light propagation; the action of each arm is felt by each transiting photon.

Details herein are presented as though the modulators' actions add directly in their effects. Those of skill in the art will appreciate that beamsplitter ratios and other optical effects will cause the actions to add in varying proportion to each other, without affecting the fundamental teachings of the invention.

Figure 3A:
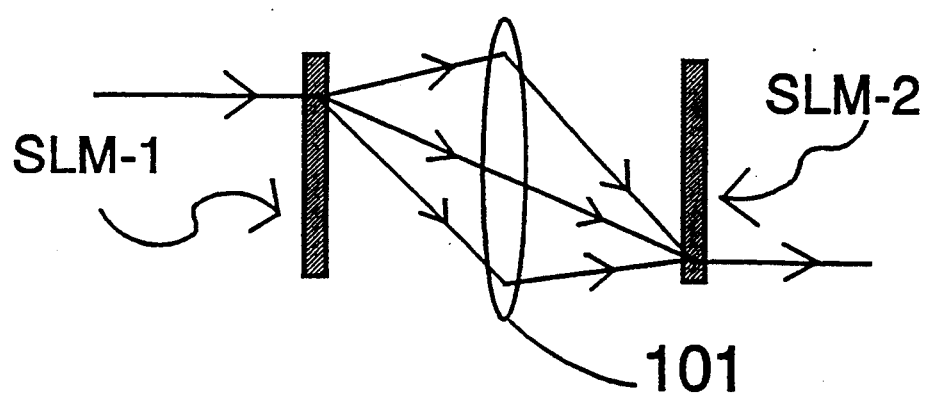
FIG. 3A illustrates a multiplicative architecture whereby the virtual image of SLM 1 is acted upon by SLM 2, yielding a product of the actions of the two SLMs.
Figure 3B:
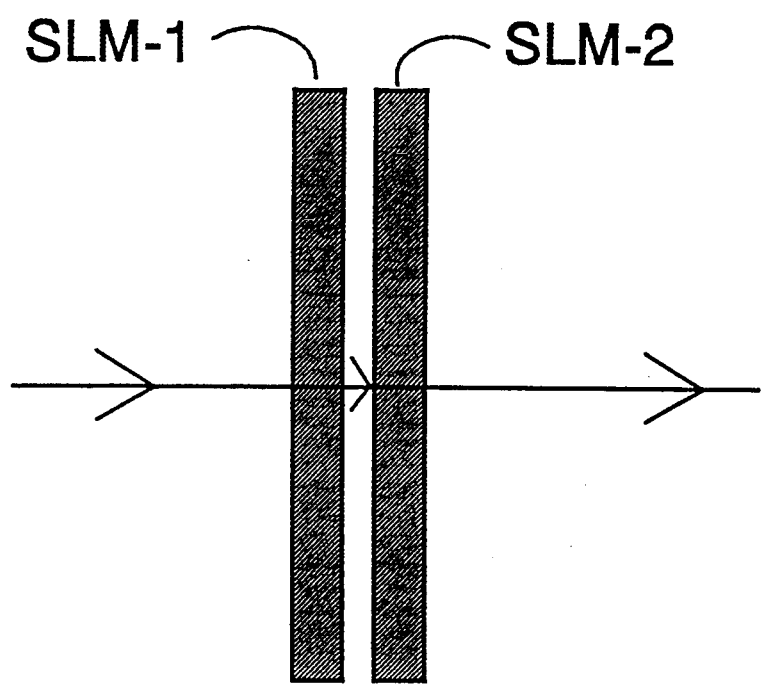
FIG. 3B illustrates another multiplicative architecture whereby the output of SLM 1 is acted upon by SLM 2, yielding a product of the actions of the two SLMs.

In the architecture shown in FIG. 3A and 3B, each observed photon will have passed through both SLMs and lens 101, experiencing the effect of each. The two SLM actions thus multiply.

Figure 4A:
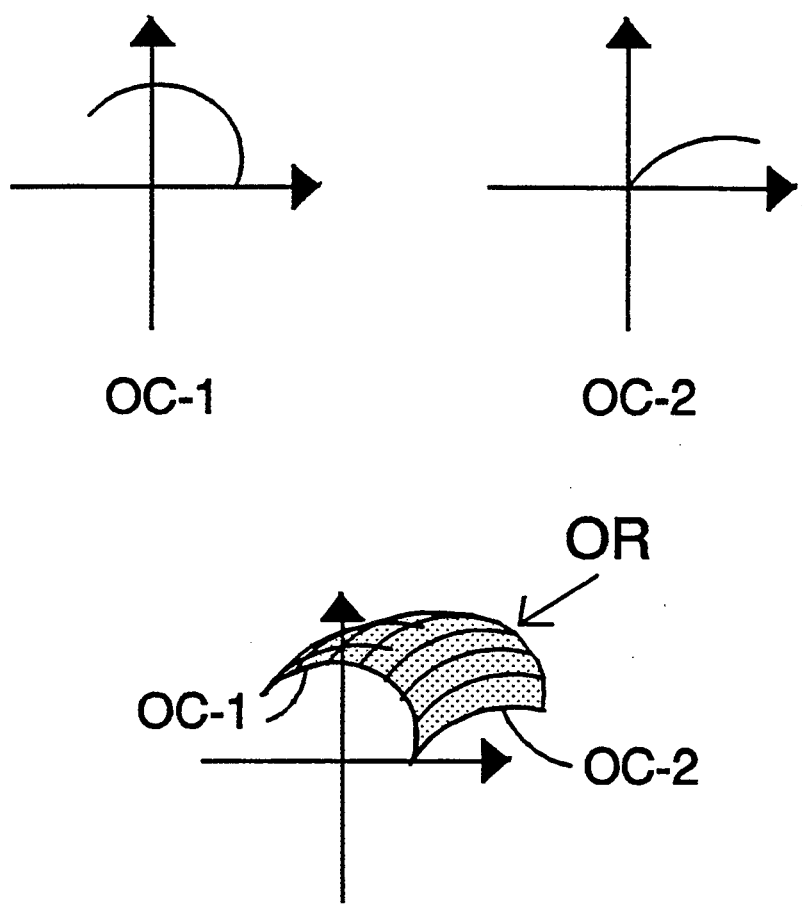
FIG. 4A shows in the complex plane operating region OR resulting from dilation of operating curve OC-1 by operating curve OC-2.
Figure 4B:
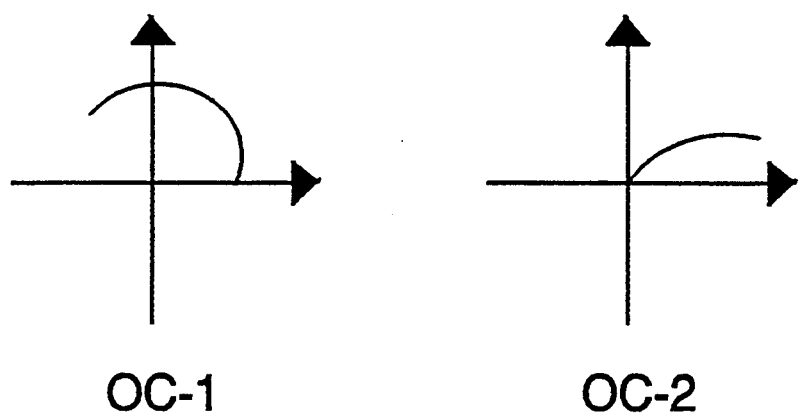
FIG. 4B shows in the complex plane operating region OR resulting from dilation of operating curve OC-2 by operating curve OC-1.
Figure 4B:
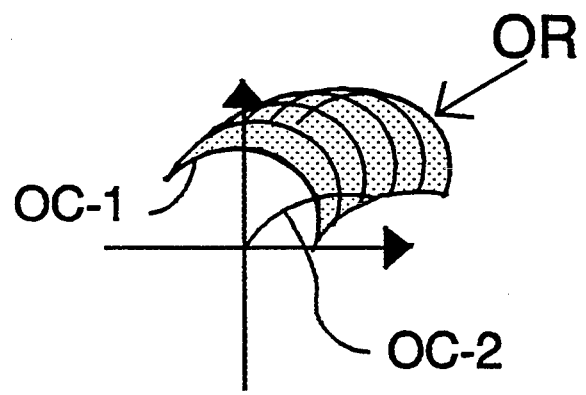

Consider first the additive case (FIG. 4A and FIG. 4B) in accordance with the present invention. In point set notation, the complex action of the combination, designated OR, is the dilation of one operating curve (OC-1 or OC-2) by the other. To determine the set of all points accessible by the additive actions, begin with an arbitrary point on the first operating curve, for example OC-1. Then find those points that differ from the arbitrary point by values lying on the operating curve of the second SLM, OC-2. Repeat for all points on the first SLM's operating curve. Each accessible point may be expressed as the sum of one point on OC-1 and one point on OC-2 for all points on OC-1 and OC-2. Since dilation is commutative, the set of accessible points thus determined does not vary with which operating curve is taken first (FIG. 4A and FIG. 4B).

$$OR = OC_1 \oplus OC_2 \qquad (2)$$

While the order in which dilation is performed on two selected operating curves does not affect the realized operating region, the selection of operating curves is significant. As seen in a comparison of FIG. 5A and 5B, it is clear that in combining OC-1 and OC-2, the extent and location of the region OR occupied in the complex plane varies with the details of the selected operating curves, OC-1 and OC-2. The pair of linear operating curves in FIG. 5A differs from those in FIG. 5B by only a phase factor. Nevertheless, the resulting operating region in FIG. 5B is substantially larger than the one in FIG. 5A.

Figure 6:
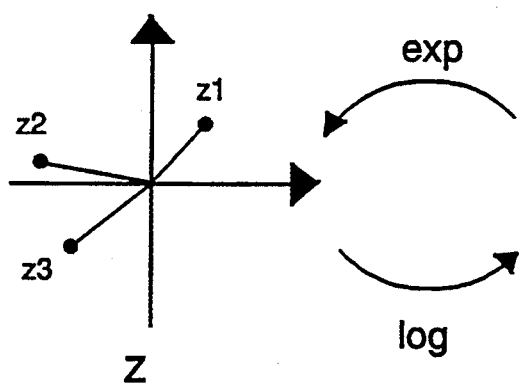
FIG. 6 shows in the complex plane the homomorphism of addition and multiplication for modulators.
Figure 6:
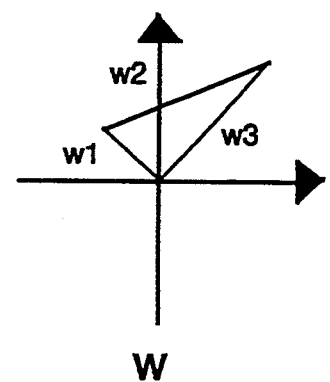

It is unnecessary to develop a separate mathematical structure for the multiplicative architectures. Multiplication is homomorphic with addition, under the log-/exp transformation pair. Taking the logarithm of points in the operating region OR allows a familiar expression: a complex point accessed as a product is seen as the sum of individual actions when all are considered in their logarithms. See FIG. 6.

Consider the mapping from control parameter, $V=[V_1 V_2]^T$ to the complex value of the filter, $H=[R\ I]^T$. The familiar Jacobian matrix $$J = \begin{bmatrix} \frac{\partial R}{\partial V_1} & \frac{\partial R}{\partial V_2} \\ \frac{\partial I}{\partial V_1} & \frac{\partial I}{\partial V_2} \end{bmatrix} \quad (3)$$

will sometimes be a convenient tool in working with the fully complex action. The ratio of differential areas as mapped to each other is det J. Access to a large area in the complex plane is the objective. The complex numbers there are dimensionless, so taking the dimensions of the control vector elements as volts, the dimensions of J are inverse square volts. In the additive configuration, collinear operating curves produce zero as det J. It has been observed that, even though the logarithmic spiral is often an efficient geometric object, it can be a poor choice of operating curve to be used in a multiplicative configuration. We see that if both contributing modulators wind in the same direction, and if the tightness of both spirals (growth factor per turn) is the same, then again we have zero for det J since the logarithm of an exponential spiral is a straight line. The slope of that line is given by the tightness of the log spiral. If the two SLMs in a multiplicative configuration operated on identical log spirals their composite action would be the same as one of the SLMs operating alone. As discussed above, accessibility to a larger region of complex values is generally advantageous. The determinant of J, integrated over the domain of control values, is a measure of the complex area accessed by the full complex configuration. That measure, however, is not in direct proportion to the utility of the SLM. In a limiting case: the fact that det J is zero would not mean that a modulator is useless, as seen from the following. (It will be appreciated that details of a practical analysis will depend on the particular signal processing circumstance to which the fully complex SLM is applied.)

Figure 7:
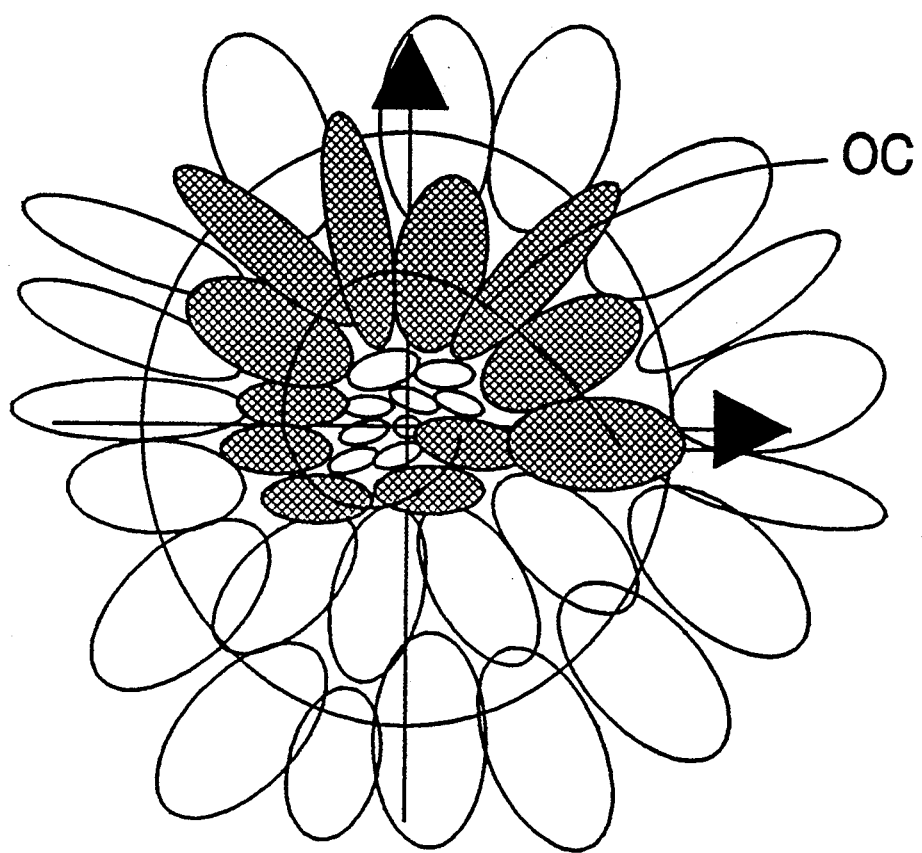
FIG. 7 illustrates the utility of an SLM by the count of complex disks.

Consider a given complex realizable value of the SLM, $H_0=x_0+jy_0$. There is a neighborhood $N_0$ about $H_0$ in which the values are not functionally different from $H_0$. Imagine covering the unit disk in the complex plane with the smallest number of such neighborhoods. The utility of an SLM can then be described as the number of those neighborhoods in which the SLM is able to express at least one complex value. This is illustrated in FIG. 7, where ellipses represent the neighborhoods of functionally indistinguishable values, and the count of shaded neighborhoods indicates the utility of the operating curve. In this example, the operating curve enters twelve of the minimal set of covering neighborhoods, so its utility is of measure 12. So even if the line required two independent controls to produce, and though det J may be zero along such a line, the utility is not in proportion to det J. Nevertheless, in signal processing situations where a larger number of distinct values is needed (i.e. smaller neighborhoods), then the integral of det J becomes more nearly proportional to the utility of accessible area. In that situation a fully complex modulator is advantageous over a discrete or curvilinear modulator.

Figure 8:
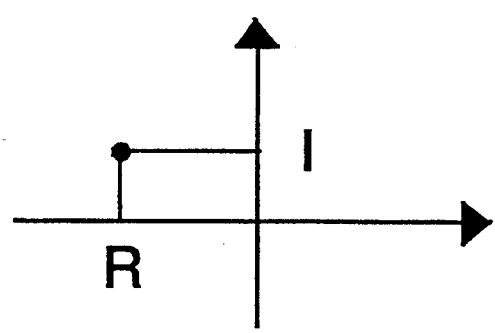
FIG. 8 illustrates in the complex plane a simple representation of decomposition by complex values.
Figure 9:
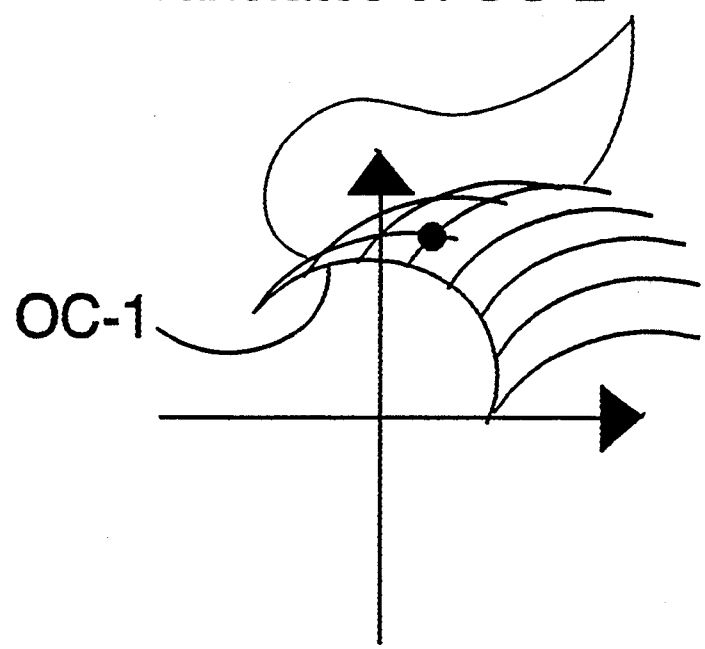
FIG. 9 illustrates in the complex plane a more difficult decomposition where the representation is not simply the real and imaginary values.
Figure 10A:
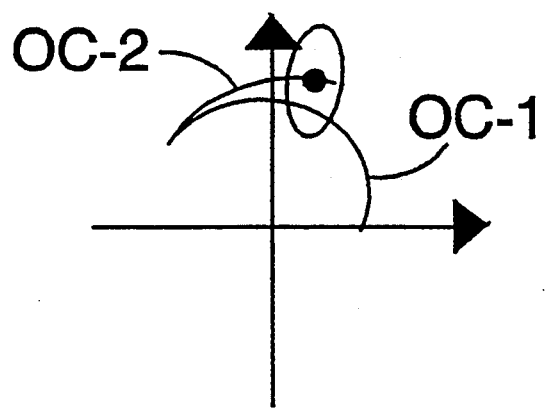
FIG. 10A shows in the complex plane one of two possible decompositions having a relatively larger expected error.
Figure 10B:
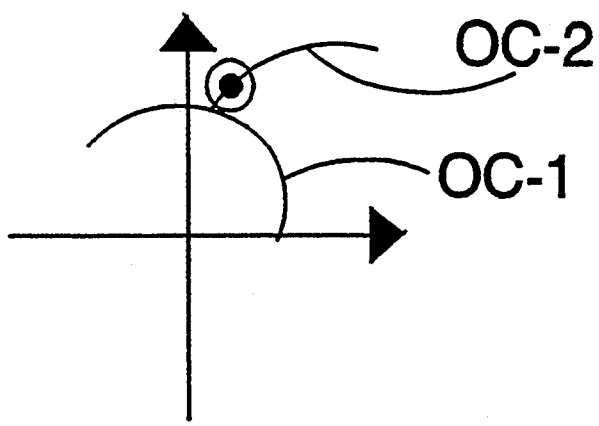
FIG. 10B shows in the complex plane the other of the two possible decompositions having a relatively smaller expected error.

A major technical problem is sometimes encountered in decomposing the value of H onto the operating curves. The details of the decomposition clearly depend on the curves' characteristics. One particularly easy decomposition is phase/amplitude onto a phase SLM in product with an amplitude SLM. The additive homomorphism is SLMs with action curves, one on the real axis and the other on the imaginary axis; see FIG. 8. In FIG. 9, the operating region for H includes a portion that is accessed by more than a single pair of operating parameters. Given a choice, one would ordinarily minimize the expectation value of the reconstitution error. In FIG. 10, the relative size of each error ellipse indicates that one of the representations will generally be preferable; here, the variance in the sum of large numbers has a larger expected value than that of the nominally identical sum of smaller numbers. The eigenvalues of J may give a clue as to the sensitivity with which an inversion from a desired value H to control V is to be done.

The additive superposition of SLMs in the architecture represented in FIG. 2 allows a novel aspect of the joint Fourier transform. In previous joint transform configurations, the images being jointly transformed are placed side by side. This has ordinarily been accommodated in that the fringes formed in the joint transform have a suitably high frequency to be detected on a CCD structure not too different in size than the SLMs themselves. They are then placed directly onto the second stage modulator. In the present configuration, the offset is conveniently and continuously adjustable, all the way down to zero, by adjusting the position of one SLM relative to the other.

Adjustment of the relative positions of the SLMs in the geometry has the advantage of making more complex area available, and there is a great sensitivity to such relative positions. Moiré patterns are a strong feature with pixellated SLMs. It has been demonstrated experimentally that even with non-monochromatic light it is possible to distinguish between the visual effects of interference fringes and moiré. The former are due to tilt (lack of parallelism) between the virtual and physical SLM locations, and the latter is due to relative positions of periodic structures within the face of an SLM (rotational alignment). Both effects may be used to do fine alignment of the SLMs. First, one SLM is adjusted relative to the other by rotation about the x—x axis or the z axis (perpendicular to plane of figure) so that the interference pattern is of infinite width (parallelism). The relative rotational positions of the SLMs may be finely tuned by adjusting them (by rotation about the y—y axis) so that the moiré is of infinite size. Translation in the z—z and x—x plane is also fine tuned by observation of the moiré fringes. The $\pi/2$ ambiguity in relative position (dimension d, FIG. 2) is avoided by doing initial alignment in non-monochromatic light, as is well known from the principle of white light fringes. Final adjustment is then done in single frequency illumination. While it is not possible simultaneously to extinguish all frequencies in an interferometer setup as in FIG. 2, with the zero path difference created with white light fringes, all frequencies are constructively added.

An SLM has a static effect on some portion of the modulated light and a controlled, or dynamic, action on another portion. The static effect shows up as a bias in the controlled action. It is often advantageous to have only a small bias, i.e., a large portion of the light is actively controlled. This is accomplished by tuning the SLM relative positions for dark fringes after changing from white to spectral illumination. Making the initial adjustment for maximum intensity in white light causes the final adjustment for minimum intensity in spectral light to be least sensitive to wavelength of the spectral light.

Obviously, the position tolerance is tighter in the reflective configurations (for example see FIG. 2) than in the transmissive ones (see FIG. 3A and FIG. 3B), since the effect of path length difference is doubled, whereas the transmissive circumstance produces first-order independence to position along the ray.

Figure 11:
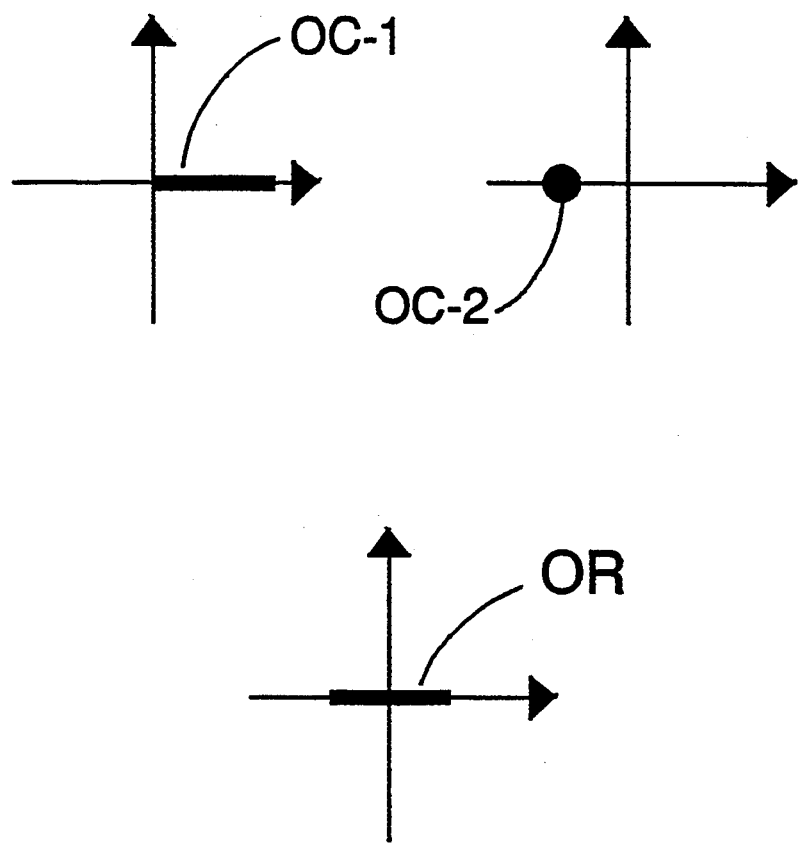
FIG. 11 shows in the complex plane how a static action in one SLM may produce a bias in the action of the other in producing the composite effect.

It will sometimes be advantageous to alter an SLM's operating curve in a manner that can be expressed as a static offset in the complex plane. An example is found in photographic film modeled as a constant phase absorptive modulator (for convenience we here consider its phase to be zero; see operating curve OC-1 in FIG. 11). It thus creates positive real values between zero and unity. Signal processing applications often would benefit from having negative filter values. For example, a large positive bias in an SLM's operating curve tends to cause filters expressed on that SLM to produce a replication of the input object in the correlation plane, whereas one would ordinarily wish to see only a correlation pattern. For the photographic example, the desired effect can be inexpensively and easily attained in this invention by placing a static reflecting surface at one of the SLM's locations. It is then finely positioned so that its phase opposes that of the film. In some conditions the static surface might be made uniform, and in others it might be patterned to match the features on the actively addressable modulator. The earlier statement, that the result of an additive combination of SLMs is the morphological dilation of one operating curve by the other, is still valid. When one of the SLMs is static, one of the "operating curves" is a point (see operating curve OC-2 in FIG. 11), so the appearance of the combination operating curve is similar to the single varying operating curve. Although we have not extended the size of the range of complex numbers available, nevertheless the shift in the position of the operating curve may have a salubrious effect in ways familiar to those skilled in the art. See operating region OR in FIG. 11.

Thus, although there have been described particular embodiments of spatial light modulators for full complex modulation which use beam splitters, it is not intended that such specific references be considered as limitations upon the scope of this invention except in-so-far as set forth in the following claims.

I claim:
1. A method for full complex modulation of light comprising the following:
   a) arranging first and second reflective spatial light modulators to produce the same virtual image location as experienced by a lightwave directed onto said first and second modulators;
   b) directing a lightwave simultaneously onto said first and second spatial light modulators;
   c) simultaneously modulating said lightwave by said first and second spatial light modulators;
   d) directing said simultaneously modulated lightwave from said first and second spatial light modulators in optical phase choherence to the same receiving location, whereby, said modulated lightwave from said first spatial light modulator and said modulated lightwave from said second spatial light modulator are additively and coherently optically superimposed at the same location, said first and second spatial light modulators modulating said lightwave independently for effecting full complex modulation of said lightwave.

2. A method for full complex modulation of light comprising the following:
   a) splitting an input lightwave into first and second mutually coherent lightwaves;
   b) reflectively modulating said first lightwave by use of a first control parameter;
   c) simultaneously reflectively modulating said second lightwave by use of a second control parameter;
   d) coherently and additively combining said first and second modulated lightwaves at an output location, said first and second control parameters being mutually independent for effecting full complex modulation of said input lightwave.

3. The method of claim 2 wherein said step of modulating said first lightwave includes selecting a first modulator having a characteristic first operating curve, said first operating curve having complex components and said step of modulating said second lightwave includes selecting a second modulator having a second operating curve, said second operating curve having complex components, whereby, said step of combining yields full complex modulation of the input lightwave.

4. The method of claim 2 wherein said step of combining said first and second lightwaves includes optically superimposing them at same output location.

5. The method of claim 2 wherein said steps of modulating a lightwave include reflecting portions of the lightwave from individually addressable translatable elements of a pixellated device.

6. The system for full complex modulation of light comprising the following:
   a) means for splitting an incoming lightwave into first and a second lightwaves;
   b) first reflective modulating means for modulating the first lightwave;
   c) second reflective modulating means for simultaneously modulating the second lightwave independently of the first lightwave;
   d) means for additively and coherently combining the first modulated lightwave and the second modulated lightwave, whereby the first modulated lightwave and the second modulated lightwave are optically superimposed and said incoming lightwave is full complex modulated.

7. The system of claim 6 whereby said means for splitting a lightwave into a first and a second lightwave is also said means for combining the first modulated lightwave and the second modulated lightwave.

8. The system of claim 6 whereby said first modulating means comprises an array of individually addressable elements, said elements being controllable by a first control parameter.

9. The system of claim 6 whereby said second modulating means comprises an array of individually addressable elements, said elements being controllable by a second control parameter.

10. The system of claim 6 wherein at least one of said first modulating means and said second modulating means is a pixellated device.

11. The system of claim 6 wherein at least one of said first modulating means and said second modulating means is addressed as a continuous function of position.

12. The system of claim 6 wherein at least one of said first modulating means and said second modulating means is a liquid crystal device.

13. The system of claim 6 wherein at least one of said first modulating means and said second modulating means is a multiple quantum well device.

14. The system for full complex modulation of light comprising the following:
   a) optics means for receiving a lightwave and for directing the lightwave to an output location;
   b) first and second reflective modulating means for modulating the lightwave, each said modulating means comprising individually addressable element means for producing a modulated portion of the lightwave, each said modulating means being located with respect to the other and with respect to said optic means so as to optically and coherently superimpose a modulated portion of the lightwave from said first modulating means upon the modulated portion of the lightwave from said second modulating means for effeCting full complex modulation of said lightwave.

15. The system of claim 14 further comprising means for controlling each addressable element.

16. The method of modulating a lightwave whereby an input lightwave is separately modulated by two reflective light modulators, each light modulator comprising individual modulating elements, the output of an individual modulating element from each light modulator being combined by system optics so as to constitute an output pixel of the modulated lightwave, comprising the steps:
   a) arranging the two reflective spatial light modulators and system optics in an architecture so that each output pixel is constituted by coherently optically superimposing the output of an individual modulating element from each light modulator;
   b) providing addressing means for each modulating element;
   c) determining the operating curve of each of the two individual modulating elements as related to their positions in the architecture;
   d) ascertaining the region of realizable complex filter values made accessible by the two operating curves for full complex modulation of Said lightwave;
   e) selecting the desired realizable composite effect for the output pixel; and
   f) applying the appropriate addressing control to each individual modulating element.

17. The method of claim 16 wherein the second modulating means is a uniform non-addressable static surface.

18. The method of claim 16 wherein the second modulating means is a patterned non-addressable static surface.

19. A method for full complex modulation of light comprising the following:
   a) providing a beam splitting prism having a first, input face, second and third faces, and a fourth, output face, said first and second faces being mutually opposite, and said third and fourth faces being mutually opposite;
   b) arranging first and second reflective spatial light modulators adjacent said second and third prism faces, respectively, said modulators comprising means for producing the same virtual image location as experienced by a lightwave directed onto said first and second modulators;
   c) optically tuning and positioning said first and second reflective spatial light modulators relative to each other and to said beam splitting prism;
   d) directing said lightwave into said beam splitting prism through said first, input prism face and causing said lightwave to be directed out of said prism simultaneously through said second prism face and onto said first spatial light modulator, and through said third prism face onto said second spatial light modulator;
   e) simultaneously modulating said lightwave by said first and second spatial light modulators and reflecting said modulated lightwave, by said first and second spatial light modulators, back into said prism through said second and third prism faces and into said beam splitting prism, said first and second optically tuned spatial light modulators coherently and additively superimposing first and second reflected lightwaves, reflected from said first and second spatial light modulators, respectively, for producing a full complex modulated, coherent lightwave;
   f) simultaneously directing the full complex modulated lightwave reflected from said first and second spatial light modulators out of said prism through said fourth, output prism face and onto the same receiving location, whereby said modulated lightwave reflected from said first spatial light modulator and said modulated lightwave reflected from said second spatial light modulator are coherently and additively optically superimposed at the same location.

20. The method of claim 19, wherein said step of simultaneously modulating a lightwave by said first and second modulators includes reflecting the lightwave from individually addressable and translatable reflective elements in a pixellated device.

21. A system for full complex modulation of light, comprising:
   a) a beam splitting prism having a first, input face, second and third faces, and a fourth, output face, said first and second faces being mutually opposite, and said second and third faces being mutually opposite;
   b) first and second reflective spatial light modulators positioned adjacent said second and third prism faces, respectively;
   c) said beam splitting prism comprising means for directing a lightwave received through said first, input face, out of said prism and onto said first and second modulators, said first spatial light modulator comprising means for spatially modulating said lightwave and reflecting it back into said prism through said second face of said prism, said second spatial light modulator comprising means for modulating said lightwave simultaneously with said first modulator and reflecting it back into said prism through said third prism face, said first and second modulators being optically tuned and positioned for coherent addition of the modulated lightwaves, said prism comprising means for additively and coherently combining and directing the modulated lightwaves reflected from said first and second spatial light modulators, through said fourth prism face and onto an output location external of said prism, said first and second modulators being controlled with independent control parameters for achieving full complex modulation of said lightwave.

22. The system of claim 21 wherein the beam splitting prism comprises a rectangular prism, and wherein said first and second reflective spatial light modulators are respectively positioned adjacent said second and third faces of said prism, said first reflective spatial light modulator being directioned toward said second prism face and in alignment with said fourth, output prism face.

23. The system for full complex modulation of light comprising:
   a) means for splitting an incoming lightwave into first and second lightwaves;
   b) first modulating means for modulating the first lightwave in accordance with a first operating parameter;
   c) second modulating means for modulating the second lightwave in accordance with a second operating parameter independent of the first parameter;
   d) means for additively and coherently combining the first lightwave and the second lightwave for optically superimposing the first and second lightwaves, the first and second operating parameters being mutually independent for effecting full complex modulation of the incoming lightwave.

24. The system of claim 23, wherein the first and second modulating means comprise reflective modulating means having individually positionable reflective elements.

* * * * *